United States Patent
Malaczynski (10) Patent No.: US 8,091,410 B2
(45) Date of Patent: Jan. 10, 2012

(54) PHASE-BASED MISFIRE DETECTION IN ENGINE ROTATION FREQUENCY DOMAIN

(75) Inventor: Gerard W. Malaczynski, Bloomfield Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 296 days.

(21) Appl. No.: 12/569,518

(22) Filed: Sep. 29, 2009

(65) Prior Publication Data

US 2011/0072893 A1 Mar. 31, 2011

(51) Int. Cl.
*G01M 15/11* (2006.01)
(52) U.S. Cl. ................................. 73/114.04
(58) Field of Classification Search ............ 73/114.02, 73/114.03, 114.04, 114.05
See application file for complete search history.

(56) References Cited

U.S. PATENT DOCUMENTS

| | | | |
|---|---|---|---|
| 5,487,008 A | 1/1996 | Ribbens et al. | |
| 7,292,933 B2 * | 11/2007 | Christensen | 701/111 |
| 7,530,261 B2 * | 5/2009 | Walters | 73/114.04 |
| 7,591,170 B2 * | 9/2009 | Lin et al. | 73/105 |
| 2008/0190184 A1 * | 8/2008 | Walters | 73/114.02 |

* cited by examiner

*Primary Examiner* — Eric S McCall
(74) *Attorney, Agent, or Firm* — Thomas N. Twomey (57) ABSTRACT

A misfire detection system monitors engine speed fluctuations in the engine rotation frequency domain and identifies misfire when a phase angle locks onto a stable value rather than fluctuating randomly. After misfire detection, the system also performs cylinder or cylinder pair identification using predefined phase angle regions, where the identification process incorporate knowledge of what phase angle region a locked phase angle falls within.

14 Claims, 10 Drawing Sheets

PHASE-BASED MISFIRE DETECTION IN ENGINE ROTATION FREQUENCY DOMAIN

TECHNICAL FIELD

The present invention relates generally to misfire detection in an internal combustion engine, and more particularly to misfire detection in the engine rotation frequency domain.

BACKGROUND OF THE INVENTION

A misfire condition in an internal combustion engine results from either a lack of combustion of the air/fuel mixture, sometimes called a total misfire, or an instability during combustion, sometimes referred to as a partial misfire. In such case, torque production attributable to the misfiring cylinder decreases. Additionally, uncombusted fuel enters the exhaust system, which is undesirable. Because of the possible impact on the ability to meet certain emission requirements, including California Air Resource Board (CARB) emission-related requirements, engine misfire detection is needed.

Misfire detection is desired across the full speed and load operating region of a vehicle. Production algorithms have been developed and employed successfully on four and six cylinder engines since the mid-90s. In this regard, the basic strategy employed measures the period for each cylinder event (i.e., 180 degrees for a 4 cylinder and 120 degrees for a 6 cylinder) and detects misfire by monitoring the variation in the time periods. Through digital processing techniques, the reference periods can be compared against each other to determine if misfire occurred and in which cylinder(s). Even on these low number of cylinder engines (i.e., 4 and 6 cylinders), there is often the need to request exceptions from CARB due to the lack of detectability. Detectability issues can be caused by a variety of root sources. First, low load and high speed (or frequency) make detectability more difficult since the underlying misfire disturbance will have less impact on the mechanical crank system. Second, increasing the inertia of the driveline and lowering the cylinder contribution, as which occurs with higher number of cylinder engines, also compromises detectability. Engine resonance effects from crankshaft oscillations can also complicate detection. Finally, variations between different engines and the corresponding target wheels (i.e., used in producing the crankshaft-originated speed signal) also complicates detection.

Various approaches for misfire detection have been proposed in the art. For example, U.S. Pat. No. 5,487,008 entitled "METHOD AND SYSTEM FOR DETECTING THE MISFIRE OF A RECIPROCATING INTERNAL COMBUSTION ENGINE IN FREQUENCY DOMAIN" issued to Ribbens et al., disclose the use of a Discrete Fourier Transform (DFT) in the context of misfire detection. However, Ribbens et al. do not disclose strategies for effectively addressing the above-noted shortcomings in the art. Additionally, existing strategies in the art using frequency domain analysis to determine misfire have been known to use adaptive thresholds. However, such approaches still encounter the same shortcoming noted above. U.S. Pat. No. 7,530,261 to Walters entitled "FOURIER-BASED MISFIRE DETECTION STRATEGY" disclose a system for misfire detection that evaluates a magnitude of a misfire detection metric.

There is therefore a need for a system and method to minimize or eliminate one or more of the problems as set forth above.

SUMMARY OF THE INVENTION

A method of misfire detection and identification has the advantages of accurate detection over a broad range of engine speed and loads, for several types of misfire including continuous, single cylinder, continuous, opposing cylinder, non-opposing cylinder and random (or sporadic), as well as proving to be immune to the target wheel machining tolerance without extensive calibrations like existing misfire detection methods usually require to address the target wheel machining error mentioned in the Background.

A method for misfire detection in an internal combustion engine system includes a number of steps. The first step involves producing a first signal corresponding to rotational characteristics of an engine crankshaft taken at selected times. In one embodiment, the first signal comprises an engine crankshaft speed signal. Next, converting the first signal into frequency-domain real and imaginary components at one or more selected harmonic orders thereof. In a certain embodiments, one or more harmonic orders can be identified in advance as being indicative of a misfire condition. The next step involves normalizing the real and imaginary components using predetermined non-misfire data indicative of corresponding real and imaginary components for non-misfire operation of the engine system. The next step involves determining, for each selected harmonic order, a respective phase angle using the normalized real and imaginary components. Finally, detecting a misfire condition when the determined phase angle is maintained within a predetermined range thereby defining a locked phase angle. The locked phase angle is indicative of a misfire condition.

In further embodiments, identification functionality indicating what cylinder or cylinder pair misfired is provided. This feature includes the further steps of defining, for each selected harmonic order, a respective plurality of predetermined phase angle regions and then identifying one or more misfiring cylinders based on at least the identity of which region the locked phase angle falls within.

A corresponding system is also disclosed.

BRIEF DESCRIPTION OF THE DRAWINGS

The present invention will now be described by way of example, with reference to the accompanying drawings.

DETAILED DESCRIPTION OF THE PREFERRED EMBODIMENT

Figure 1:
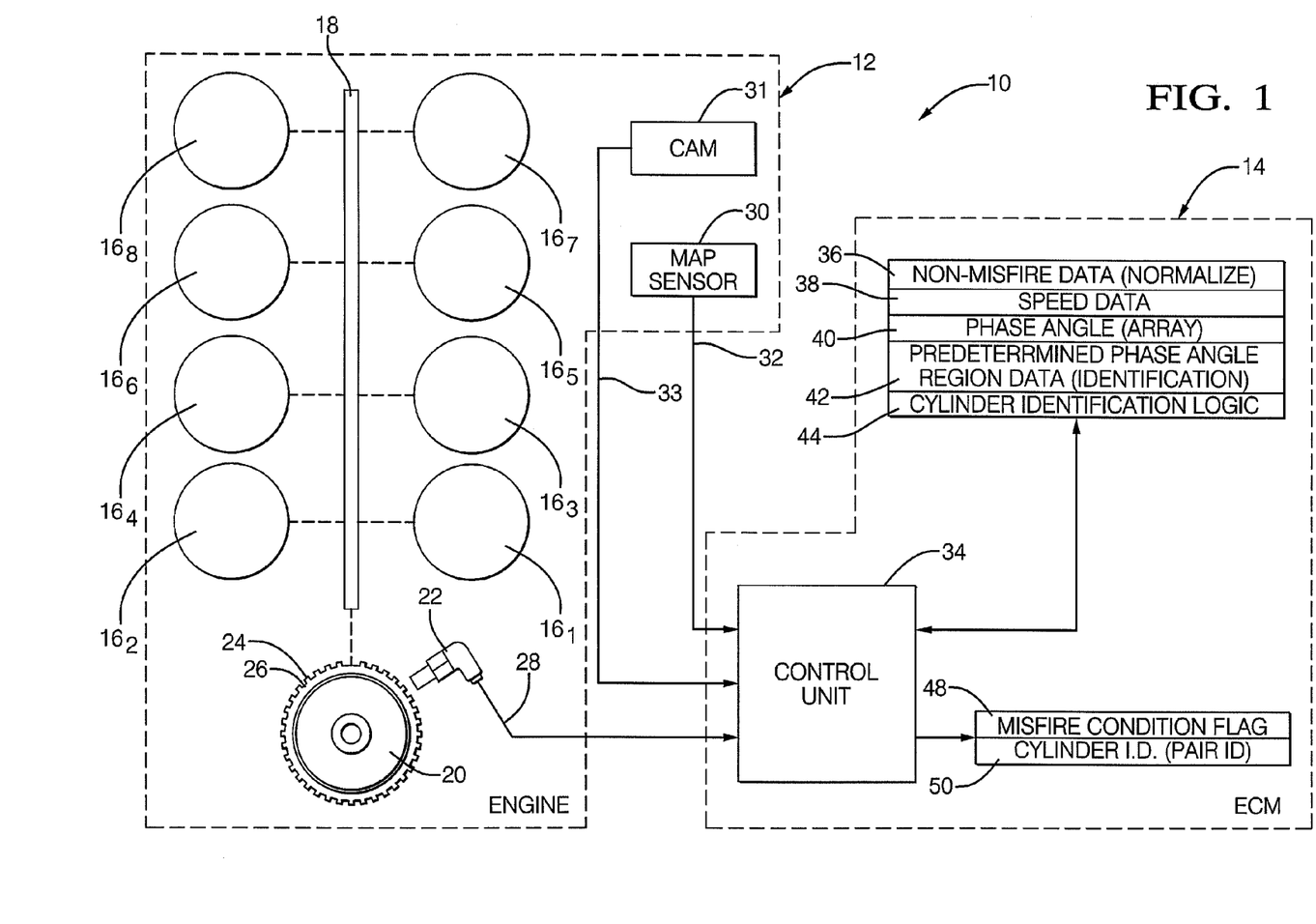
FIG. 1 is a simplified diagrammatic and block diagram view of a misfire detection system in accordance with the present invention.

Referring now to the drawings wherein like reference numerals are used to identify identical components, FIG. 1 shows an internal combustion engine system 10 including an internal combustion engine 12 whose operation is controlled by a programmed, electronic engine control module (ECM) 14 or the like, as known generally in the art. System 10 is configured to provide improved misfire detection as to either an individual cylinder or multiple cylinder (e.g., a cylinder pair). System 10 includes improved discrimination capability that provides for more effective detection for higher number cylinder engines as well as over greater engine speed/load ranges.

System 10 generally employs frequency domain, Fast Fourier Transformation technique, to evaluate the spectral content of a crankshaft-originated speed signal. Speed fluctuations due to misfire result in certain harmonics being present in the frequency domain transformation of the crankshaft-originated speed signal. Certain harmonics of angular crankshaft velocity are indicative of engine imbalance induced by cylinder misfire. Application of the Digital Fourier Transformation (DFT) facilitates the production-feasible calculation of a single harmonic amplitude indicative either of smooth engine operation or misfire. The phase of that particular harmonic with proper interpretation directly points to a misfiring cylinder. The identification of a misfiring pair, either opposing or a non-opposing in the cylinder bank, requires a more sophisticated approach since the phase response of the characteristic harmonic becomes more complex. The method described herein was successfully applied in real time in four-, six-, and eight-cylinder engines, both spark-ignition (SI) and Diesel, for an On-Board Diagnostic (OBD) application with reliability exceeding relevant regulatory requirements.

Before proceeding to a detailed, an overview will be first set forth. One purpose of the misfire diagnostic (executing in system 10) is to continuously monitor for misfiring cylinders during the operation of a motor vehicle. The importance of misfire detection is two-fold. First, a complete or partial misfire will generate a undesirable quantity of unburned hydrocarbons that can lead to excessive emissions. Second, the simultaneous presence of oxygen and unburned hydrocarbons in a hot catalytic converter of spark-ignition (SI) engine can lead to catalyst damage. This, in turn may lead to higher emissions because of lower catalyst efficiency. In the case of diesel engines, different effects occur depending on different failure causes. Injector failure resulting in no injection on one cylinder may result in increased NO and particulate matter (PM) emissions due to the fact that the other cylinders will operate at increased load to compensate for the torque demand and, at the same time, there is a risk of exceeding the maximum allowable particulate filter temperatures in regeneration mode. A stuck-open injector failure will result in increased hydrocarbon and carbon monoxide emissions, and will risk exceeding maximum allowable oxidation-catalyst and particulate-filter temperatures.

Consequently, a misfire diagnostic operating in system 10 is adapted to determine when the engine is misfiring, to locate the misfiring cylinder or cylinders, to count and record the misfiring events, and to provide the on-board diagnostic with a warning flag in case of repeated misfire events. Any of these conditions would signal the necessity for engine service or to stop engine operation to prevent catalyst damage. The misfire detection diagnostic is designed to meet U.S. OBDII and EOBD requirements.

Embodiments of the misfire detection method described herein may employ a Discrete Fourier Transformation (DFT) of a crankshaft-oriented speed signal. Particularly, the method involves assessment of the statistical behavior of a phase component of one or more selected corresponding DFT-derived harmonic orders. During normal (non-misfire) operation, the engine is always represented by a randomly distributed phase component in the DFT-produced frequency domain, while a misfire of a single cylinder or misfire of any cylinder pair results in "locked" phase of the misfire-indicative harmonic order. It must be noted that misfire-free operation produces a low level magnitude of the DFT-processed polar signal. This is a consequence of the signal normalization process which is achieved by subtracting pre-calibrated normal engine behavior from the signal being acquired in real time during the engine service operation.

Figure 2:
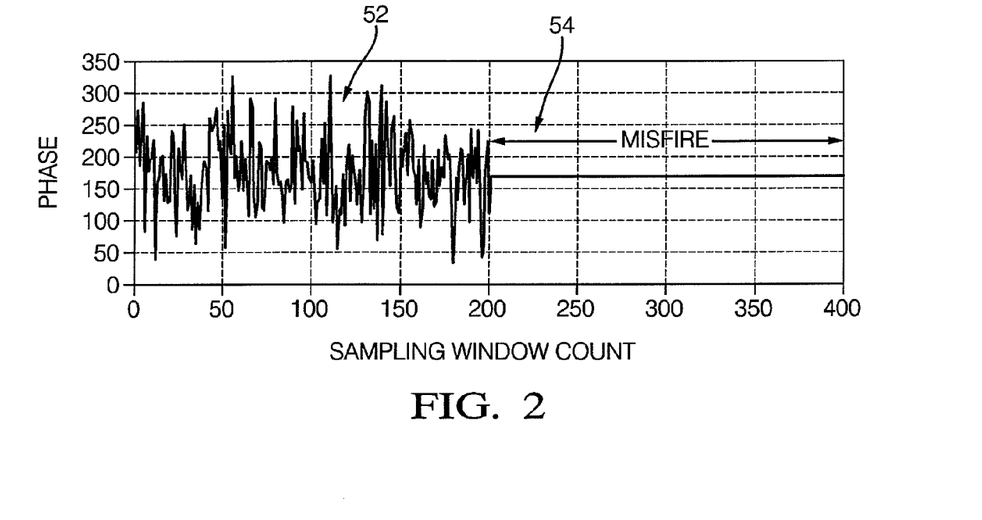
FIG. 2 is a phase signal of a normalized DFT signal, showing a randomized portion in the case of no misfire and a phase-locked portion in the case of misfire.

FIG. 2 is a phase diagram of a normalized DFT signal. Note, there is a first portion 52 that shows randomized values in the case of no cylinder misfire. On the other hand, FIG. 2 also shows a second portion 54 that illustrates the phase-lock that occurs in the case of misfire. Detecting the phase lock in one or more selected harmonics directly indicates a misfiring cylinder or cylinder pair. A system and various methods are described based on this principle to detect several misfire types as well as identify the misfiring cylinder(s).

Referring again to FIG. 1, engine 12 includes a plurality of cylinders, illustrated in exemplary fashion as a V-type, 8-cylinder engine where the cylinders are designated $16_1$, $16_2$, $16_3$, ..., $16_8$. In one arrangement, for example, the firing order may be designated as cylinders 1-8-7-2-6-5-4-3. Of course, other numbering schemes and/or firing orders are possible, as known in the art. Moreover, the system 10 may not be limited to any particular number of cylinders, i.e., an eight cylinder engine as shown is exemplary only. For example, in six-cylinder embodiments, the firing order may be cylinders 1-2-3-4-5-6.

The basic arrangement of engine 12 is known in the art, and will not be repeated exhaustively herein in detail. However, it should be understood that each cylinder $16_1$, $16_2$, $16_3$, ..., $16_8$ is equipped with a corresponding piston (not shown), which is connected to a common crankshaft 18, as shown by the dashed-line in FIG. 1. As known, the crankshaft 18 is coupled to a powertrain (e.g., transmission and other drivetrain components—not shown) in order to provide power to a vehicle (not shown) for movement. Controlled firing of the cylinders causes the various pistons to reciprocate in their respective cylinders, causing the crankshaft to rotate. There is a known relationship between the angular position of the crankshaft 18, and each of the pistons. Each piston, as it reciprocates, moves through various positions in its cylinder, and any particular position is typically expressed as a crankshaft angle with respect to top-dead-center position. In the well-known 4 stroke engine (intake-compression-power-exhaust), two full revolutions (720 degrees) of the crankshaft 18 occur to complete one engine (combustion) cycle.

FIG. 1 further shows a target wheel 20 and a corresponding sensor 22. Target wheel 20 is configured for rotation with crankshaft 18. Target wheel 20 includes a plurality of radially-outwardly projecting teeth 24 separated by intervening slots 26. Target wheel 20 and sensor 22 are, in combination, configured to provided an output signal 28 that is indicative of the angular position of crankshaft 18. Output signal 28, as described below, may be used to derive a speed indicative signal.

As described in the Background, it is known to measure a time variation in the firing event period (720°/# cylinders) to determine if misfire occurred. Early systems used 2×, 3× and 4× target wheels for 4, 6, and 8 cylinder engines respectively. In recent years, higher count target wheels are more commonly employed on engines, with one common variant being the 58×, i.e., 60–2; 58 teeth spaced around the wheel, spaced as though there were 60 evenly spaced teeth but with two teeth missing. The space where the teeth are missing is known as the synchronization gap. The target wheel 20 may be the 58× form target wheel known in the art. This form of a target wheel 20 provides a rising edge in the output signal every 6 degrees, with the exception of the 2 tooth gap, which as known is used as a reference. A speed-based signal can be formed by determining the speed, or a representative signal, every 6 degrees or multiples of 6 degrees as typically only one edge is used. As will be described below, however, a sampling rate lower than every tooth may be suitable for embodiments consistent with the invention (e.g., 15 samples/revolution).

FIG. 1 further shows an engine load indicative sensor such as an intake manifold absolute pressure (MAP) sensor 30 and a camshaft position sensor (CAM) 31. The MAP sensor 30 is configured to produce an output signal 32 indicative of manifold absolute pressure. The output signal 32 is indicative of engine load. It should be understood that other signals may be used as a proxy for load, including but not limited to a mass air flow (MAF) signal or a throttle position signal. The CAM sensor 31 is configured to generate a CAM signal 33 that is indicative of which rotation of the engine cycle the crankshaft is on. That is, the crankshaft sensor output signal 28 alone is insufficient to determine whether the crankshaft is on the first 360 degree rotation or on the second 360 degree rotation, which would together define an engine cycle for a four-stroke engine.

The ECM 14 may include a control unit 34 that is characterized by general computing capability, memory storage, input/output (interface) capabilities and the like, all as known in the art. ECM 14 is configured generally to receive a plurality of input signals representing various operating parameters associated with engine 12. Aside from the misfire detection function, the ECM 14 is typically configured with various control strategies for producing needed output signals, such as fuel delivery control signals (for fuel injectors—not shown) all in order to control the combustion events, as well as spark timing signals (for respective spark plugs—not shown). In this regard, ECM 14 may be programmed in accordance with conventional, known air/fuel control strategies and spark timing strategies.

The control unit 34 is configured to perform the misfire detection and cylinder or cylinder pair identification methodology described herein. It should be understood that the functional and other descriptions and accompanying illustrations contained herein will enable one of ordinary skill in the art to make and use embodiments without undue experimentation. It is contemplated that the invention will be practiced through programmed operation (i.e., execution of software computer programs) of control unit 34. As used herein, the data may be viewed as electronic signals although embodied in software as stored values.

FIG. 1 further shows control unit 34 in communication with a data structure or the like configured to store a variety of data as well as program logic. It should be understood that some of the data is determined and stored in advance of real-time misfire detection and cylinder identification, while other data is calculated during operation of the engine system 10 and stored temporarily. Such a data structure may be implemented in a separate memory or may be implemented in memory that is integral with control unit 34.

The control unit 34 has access to various data and program logic including non-misfire data 36 (i.e., for normalization purposes), speed data or signal 38 (i.e., indicative of the rotational characteristics of the crankshaft), calculated phase angle data (array) 40, predetermined phase angle region data 42 (i.e., for misfiring cylinder(s) identification) and misfiring cylinder(s) identification logic 44. The speed data 38 comprises, in one embodiment, an array of timestamp information corresponding to the known, angular positions of crankshaft 18 generated by way of information produced by target wheel 20 and sensor 22 during rotation. Speed data 38 may further comprise derivations of this information, in the form of a speed and/or acceleration signals. The other data 36, 40, 42 and 44 will be described in greater detail below.

The control unit 34 is further configured to at least produce an output signal indicative of whether a misfire occurred, such as for example an internal misfire condition flag 48 as well as an output signal identifying the single cylinder that misfired, or what multiple cylinders (e.g., cylinder pair) misfired, such as by a cylinder identification flag 50. It should be understood that control unit 34 may be configured to produce these flags as externally available electrical signals.

To re-iterate the Background, underperformance of individual cylinders in delivering torque is imaged closely by engine rotational speed fluctuations. Therefore, time samples taken from the crankshaft target wheel 20 at every combustion event typically provide a good basis for engine misfire monitoring. However, high engine speeds in the presence of low loads, especially for engines with six or more cylinders, represent a challenge for misfire algorithms which use time-based techniques to extract engine misbehaviors and identify the misfiring cylinder. This is due to the fact that at high rotational speeds with minimal loads, the mechanical system inertia masks misfiring events, providing enough momentum to maintain almost undisturbed rotational speed. If a misfire algorithm compares consecutive rotations to detect the difference indicative of misfire of an opposing cylinder pair (i.e., same firing position in two cylinder banks/revolutions), then the detectability situation, especially at high engine speeds, becomes even worse. This is due to the fact that the reference base to the normal engine performance (i.e., rotation with all cylinders firing) is totally lost since both cylinder banks (i.e., consecutive revolutions of the crankshaft) demonstrate identical behavior. Some improvement can be achieved when the number of time samples is increased to more than one per combustion event. In such case, however, data processing in the frequency domain seems to be naturally preferable.

The misfire detection method, in one embodiment, uses timestamp samples collected from a 58× crankshaft target wheel 20. As described above, target wheel 20 has a so-called synchronization gap—a gap where teeth 24 are missing and thus no transitions are generated. Nonetheless, uniform space distribution (i.e., angular distance) between time samples can be achieved by taking for example fifteen (15) samples per revolution. The maximum number of samples (for the 58× wheel and uniform spacing) would be twenty (20) samples per revolution, but such an approach would involve sampling the tooth 24 positioned next to the target wheel's synchronization gap where performance of the sensor 22 might be questionable. A (20) sample/revolution rate would also increase the amount of data which requires processing in real time and the output delivery once per combustion cycle. Consequently, in a preferred embodiment, a 15-sample-per-revolution approach has been adopted. This sampling-rate scheme translates into a space resolution of 24 degrees (i.e., in the crankshaft angle domain), while for example the 8-cylinder engine fires every 90 degrees. Moreover, processing already available in conventional implementations of control unit 34 will make a speed reading or the like available at set angular position increments dictated by the tooth spacing of the target wheel 20. In sum, while timestamps may be recorded by control unit 34 at each tooth interval of target wheel 20 (i.e., an edge is available every six degrees) and maintained in memory, preferred embodiments use a more coarse sampling (i.e., 15 samples/revolution).

The misfire detection method employs Digital Fourier Transform (DFT) techniques to convert time-based engine speed signal into a frequency-domain signal, where certain, selected harmonic orders are evaluated to detect misfire. The method is based on the observation that any single cylinder misfire, or opposing and non-opposing pairs misfire event "locks" the phase of the relevant harmonic. The word relevant is used to emphasize the fact that different harmonics may represent different types of misfire (e.g., pair, single cylinder, continuous, sporadic). It should be understood that the definition of harmonic, in the case of DFT, is related to the number of samples acquired in a selected sampling window, rather than being related to some fundamental frequency, for example, representing periodicity of combustion events. Thus, with constant sampling at every 24 degrees, the order of harmonics is solely defined by the number of samples in a selected sampling window.

The Digital Fourier Transformation (DFT) from the time domain, where signal x is represented by the series of samples (i.e., from i=0 to N−1 samples for a total of N samples) within the selected sampling window, can be expressed by equations (1) and (2) that provide real (designated "Re") and imaginary (designated "Im") components of the transformed signal X for harmonic k:

$$\text{Re}(X(k)) = \sum_{i=0}^{N-1} x(i) \cdot \cos(2\pi k i / N) \quad (1)$$

$$\text{Im}(X(k)) = \sum_{i=0}^{N-1} x(i) \cdot \sin(2\pi k i / N) \quad (2)$$

The array x represents the collection of angular velocities calculated from time samples taken every 24 degrees from the 58× target wheel (i.e., 15 times per revolution).

Equations (1) and (2) may be used to calculate the real and imaginary portions of the angular crankshaft velocity with the absence of misfire. That is, the result of the DFT includes as an initial matter both a real component and an imaginary component (i.e., a complex quantity). This in conventional parlance may be plotted on a rectangular coordinate system, with the real component on the "x" axis and the imaginary component on the "y" axis. This complex quantity may be equivalently represented as a magnitude and a corresponding phase, through well known relationships. Since the methods described herein pertain particularly to phase, the polar coordinate system will typically be used.

The methods herein then, typically in real time, perform normalization using pre-calculated tables of real and imaginary representations of the same signal collected under the misfire-free conditions. This frequency-domain operation may be expressed as per equations (3) and (4):

$$Re(XN(k))=Re(X(k)-Re(Xn(k)) \quad (3)$$

$$Im(XN(k))=Im(X(k)-Im(Xn(k)) \quad (4)$$

The index N denotes the normalized value, while index n represents calibration-table values collected under the engine misfire-free conditions.

The phase and magnitude (amplitude) of the normalized signal are given by equations (5) and (6):

$$\text{Phase}N=\arctan\{Im[XN(k)]/Re[(XN(k)]\} \quad (5)$$

$$\text{Magnitude}N=\arctan\{Re[XN(k)]/Im[(XN(k)]\} \quad (6)$$

Since misfire-event information for a particular misfire condition resides in a singular harmonic, the computation process may be reduced to the calculation of a single harmonic (i.e., rather than computing an entire series of harmonics). Consequently, the equations (3) and (4) represent simple subtractions of one constant from another where k is a single number and N is equal to number of samples taken in the selected sampling window (see Equations (1) and (2)). Thus, the normalized phase (in degrees) of a single harmonic, for example, the fourth harmonic (i.e., k=4) upon substitution is written in equation (7):

$$\text{Phase}N(4)=(360/2\pi)\arctan\{Im[XN(4)]/Re[(XN(4)]\} \quad (7)$$

The normalized real and imaginary angular speed transforms (XN) described in equations (3) and (4) can be either positive or negative. This possibility thus requires the computation of the arctan function in all four quadrants. Of course, the sampling window must be a multiple of combustion cycles to monitor misfires as this clearly represents departure from the engine's cyclic behavior.

In embodiments of the invention, at least two different sampling windows may be used to sense misfiring events, one for continuous misfires and one for sporadic misfires. Within the continuous misfire window, one harmonic is associated with a single cylinder misfire while a different harmonic is associated with a misfiring cylinder pair. Identification of misfire-specific harmonics can be easily performed by analyzing the full frequency spectrum defined by the number of samples within a sampling window.

Figure 3:
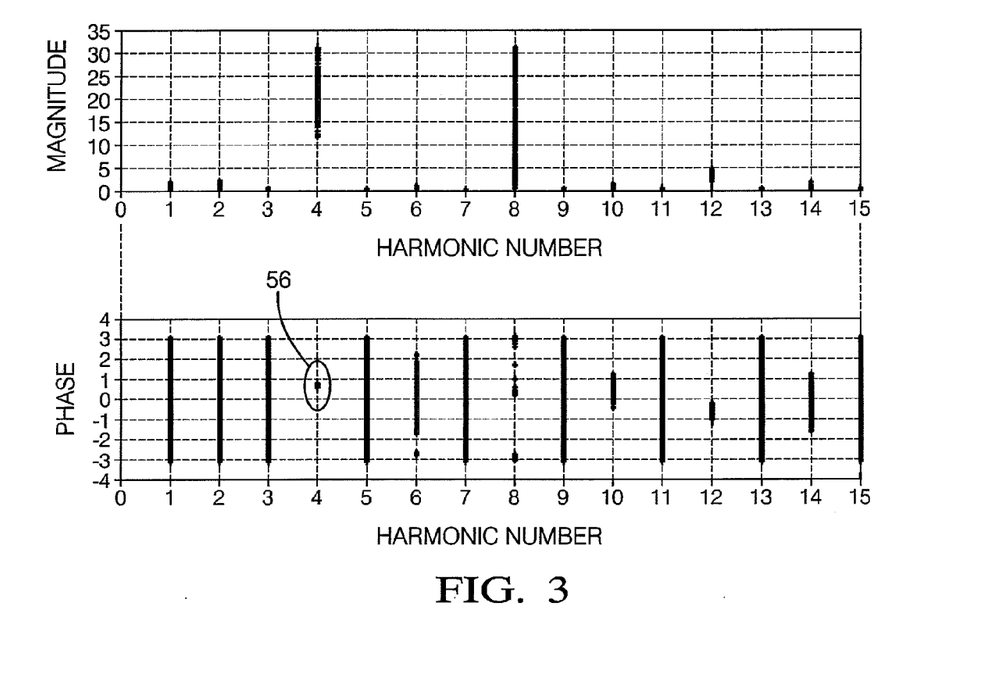
FIG. 3 is a DFT derived spectrum of an engine crankshaft speed signal in the case of continuous misfire of an opposing cylinder pair.

FIG. 3 is a DFT-derived spectrum of an engine featuring continuous misfires of an opposing cylinder pair. The calculated phase (in radians) and magnitude are shown versus the various harmonic orders (e.g., $1^{st}$ through $15^{th}$). The data used was collected for over 2000 combustion cycles at various engine speeds. Note that the fourth harmonic locks it phase, inasmuch as the phase value stays tightly within a predetermined range (i.e., see the encircled region designated 56 in FIG. 3). Due to the normalization process (i.e., relative to a non-misfire baseline), if misfires events are absent, the magnitude of those harmonics remains at a very low level and the phase becomes randomized (i.e., noise). It warrants emphasizing that despite the rise of the fourth harmonic's magnitude, its phase provides better input for detecting a misfire. This is due to the fact that the magnitude is engine-speed and load dependent. The higher the engine speed, the lower the amplitude of the harmonic's magnitude component which represents a misfire. This is precisely why high engine speed represents a more serious challenge for misfire detection. As described in the Background, engine inertia attenuates response to the imbalance created by a misfire. Consequently, magnitude-based misfire detection requires an additional calibration procedure which would raise the misfire flag only if the calculated magnitude component is above a threshold level where the threshold level is engine speed and load dependent.

Figure 4:
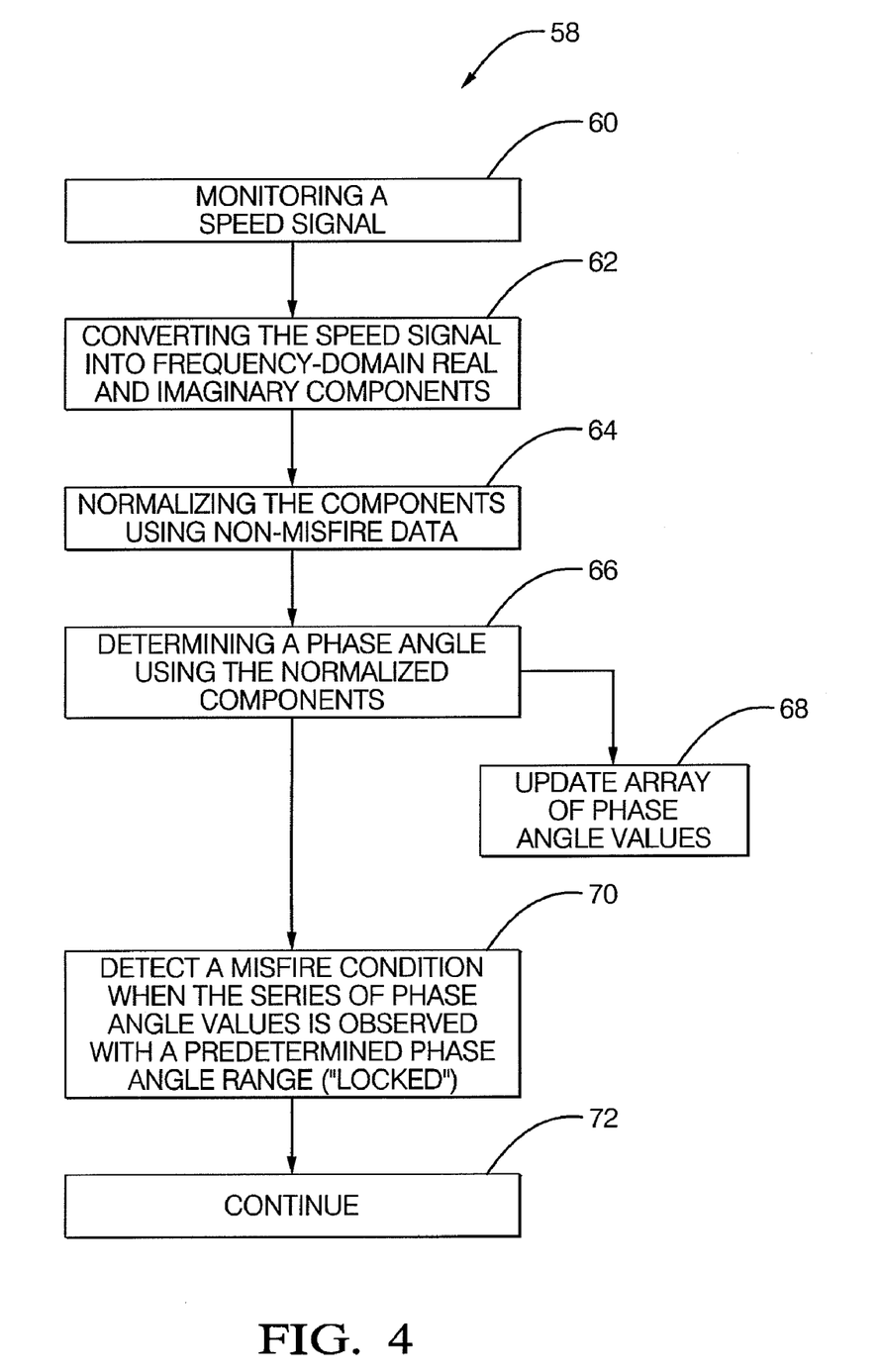
FIG. 4 is a flow chart diagram illustrating a method for detecting misfire.

FIG. 4 is a flow chart diagram showing, generally, the steps of a method of detecting misfire, which is designated method 58. With the description presented thus far, the method begins in step 60.

In step 60, the method involves producing a speed signal corresponding to the rotational characteristics of the engine crankshaft 18 taken at selected times. The target wheel 20, sensor 22 as well as the sampling rate and sampling window have been described above. The end result, in one embodiment, is an array of values, which collectively define a speed data or signal 38 (best shown in block form in FIG. 1) is indicative of the angular speed of the crankshaft 18. The speed data 38 is preferably obtained during run-time operation of the engine system 10, and may or may not reflect a misfire condition. The method proceeds to step 62.

In step 62, the method involves converting the speed data or signal 38 into a corresponding frequency-domain signal having real and imaginary components, at one or more selected harmonic orders thereof. Equations (1) and (2) above may be used to perform this converting step. As noted, not all harmonic orders need be evaluated; only those of interest may be evaluated (for example, Equation (7) illustrates calculation of the phase of $4^{th}$ harmonic). For example, in one window size and sampling rate scheme, the second ($2^{nd}$) order harmonic was identified as indicative of a single cylinder misfire while the fourth ($4^{th}$) order harmonic was identified as indicative of a cylinder pair misfire. However, it should be understood that different windowing schemes and/or sampling rates may result in a different harmonic order being relevant or indicative of either single cylinder or opposing cylinder pair misfire. The method proceeds to step 64.

In step 64, the method further involves normalizing, for each harmonic order calculated in step 62, the respective real and imaginary components using predetermined non-misfire data 36 (best shown in block form in FIG. 1). The non-misfire data 36 may, in one embodiment, correspond to real and imaginary components calculated based on engine speed test data obtained by operating an engine of the same configuration but without any misfire events, and then transforming that test (engine speed) data using equations (1) and (2). The non-misfire data 36 therefore includes, for each harmonic being used, corresponding values its real and imaginary component. The method then proceeds to step 66.

In step 66, the method involves determining, for each selected harmonic, a respective phase angle using the normalized real and imaginary components. Equation (5) set forth above may be used to calculate the value for the phase angle (for each harmonic order being calculated). In step 68, for harmonic, the calculated phase angle values is stored, for example, in a memory so as to populate the phase angle array 40 (best shown in block form in FIG. 1). The method proceeds to step 70.

In step 70, the method further involves the step of detecting a misfire condition when the phase angle is maintained within a predetermined range, for example, for at least a minimum number of engine (combustion) cycles. This is the phase lock behavior described above. It should be emphasized that a single phase angle value, by itself, is in most instances inadequate to demonstrate phase locking behavior; rather, the method is configured to assess a plurality of phase angle values (for each harmonic) to determine whether it has locked on to a nominal value (meaning a misfire) or whether it exhibits random fluctuations indicative of no misfire. Moreover, as described in greater detail below, the phase angle generally locks onto a mean within a statistical distribution, such some variation in the value can be expected and still be considered phase-locked. Variation (random) between 0-360 degrees is not locked. In one embodiment, phase-locked means that its value remains within a designated (for individual cylinder) central portion of the pie quadrant (i.e., the phase angle region). In the case of opposing and non-opposing pairs, the central portion of the quadrant (region) indicates an opposing pair while the periphery indicates a non-opposing pair. A description of the how a phase angle region (for detection purposes) may be broken up into a central sector and a pair of off-center sectors will be described below. If values of the phase angle jumps between regions (in the case of continuous single cylinder or cylinder pair misfire logic), the logic treats such a case as a random phase, i.e., decides that the misfire (continuous) is absent. In the case of a sporadic misfire, best results are delivered when phase monitoring is combined with magnitude monitoring, but requires calibration to define the threshold level.

The previously described steps constitute the general methodology for misfire detection. Variations and extensions will be described below for detecting particular types of misfire and for identifying the single cylinder or cylinder pair that misfired. The method proceeds to step 72.

In step 72, various steps continue to be performed. For example, the step of producing a speed signal (step 60) is ongoing in an operating engine system 10, and whose sampling occurs at a rate and within a window as described above. Likewise, the converting, normalizing and phase angle determining steps (steps 62, 64 and 66) are also ongoing; however, they may be performed less often, typically only after a full window of speed samples have been acquired. As the steps 62, 64 and 66 are performed, additional values for the phase angle (for each harmonic) are stored (step 68) and the detecting misfire step 70, which uses the phase angle array 40, may execute, optionally, on a still different loop. No necessary requirement of sequential performance is implied by the flowchart of FIG. 4.

Two functions performed by the methods described herein involve detecting different types of misfire as well as identifying the cylinder(s) that misfired. One type of misfire is continuous, single cylinder misfire, which is characterized by consistent misfire in a single cylinder of the engine 12. Another type is continuous, opposing cylinder misfire, which is characterized by consistent misfire by one cylinder in a certain angular position during the first revolution of the crankshaft (in the engine cycle), and then consistent misfire by another cylinder in the same angular position but during the second revolution. For example, for a 6-cylinder engine with a firing order of 1-2-3-4-5-6, cylinder pair 1-4, pair 2-5 and pair 3-6 would be considered opposing cylinder pairs. As mentioned above, this type of misfire is perhaps the most difficult to detect inasmuch as the rotational characteristics of the second revolution are not very different from the first revolution, even though they both are different from the non-misfire case. Another type is continuous non-opposing cylinder misfire, which is characterized by consistent misfire of a pair of cylinders that are not opposing cylinders (e.g., pair 1-2 and pair 1-3 are non-opposing cylinders). A further type is random or sporadic single cylinder misfire, which is characterized by unpredictable single cylinder misfire, or unpredictable misfire of more than one cylinder.

Figure 5A:
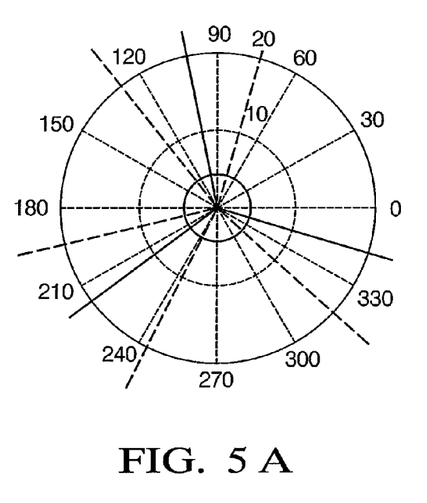
FIGS. 5A-5C are polar diagrams and a magnitude/phase diagram illustrating characteristics of a continuous, single cylinder misfire.
Figure 5B:
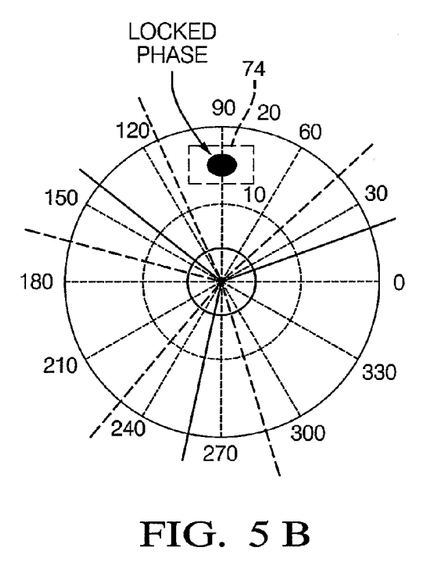
Figure 5C:
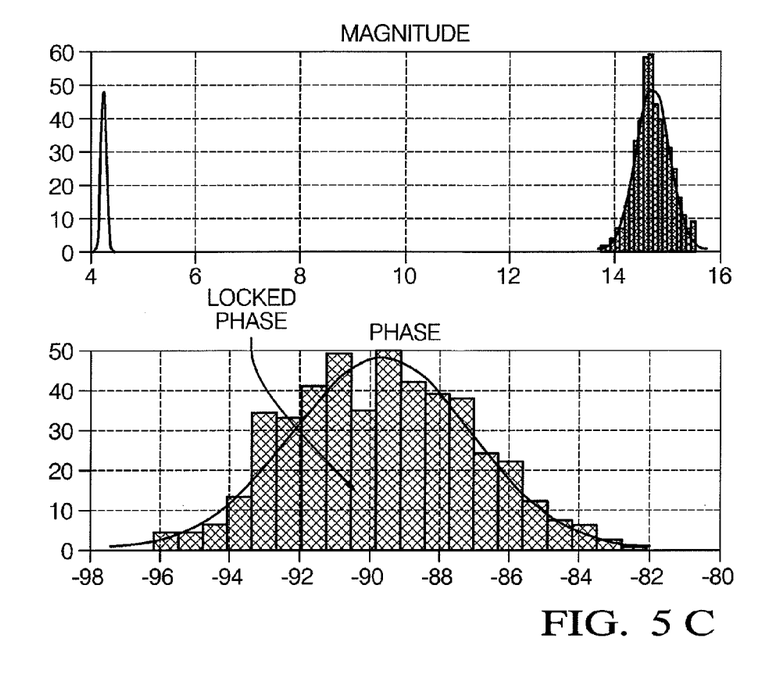

Continuous, Single Cylinder Misfire. FIGS. 5A-5C show polar diagrams and phase/magnitude diagrams for a continuous, single cylinder misfire. FIG. 5A shows a polar diagram with no phase angle data plotted thereon. FIG. 5B is the same polar diagram but with plotted phase angle data, derived from the second harmonic in the DFT based on engine speed data obtained from an engine having an induced continuous, single cylinder misfire. It should be appreciated that the array of phase angle values (shown by reference numeral 74) is "locked" in at about −90 degrees (pie quadrant is marked by solid lines and its center is bounded by broken lines), within a predetermined range. The distribution of the calculated phase angle values is plotted in FIG. 5C, where it can be seen to assume a normal Gaussian type distribution. Other continuous, single cylinder misfire events will result in a similar cluster of phase angle data points ("phase locked"), although the position of the data cluster (i.e., on polar diagram) will be different and distinct from the other single misfiring cylinders in the engine.

Figure 6A:
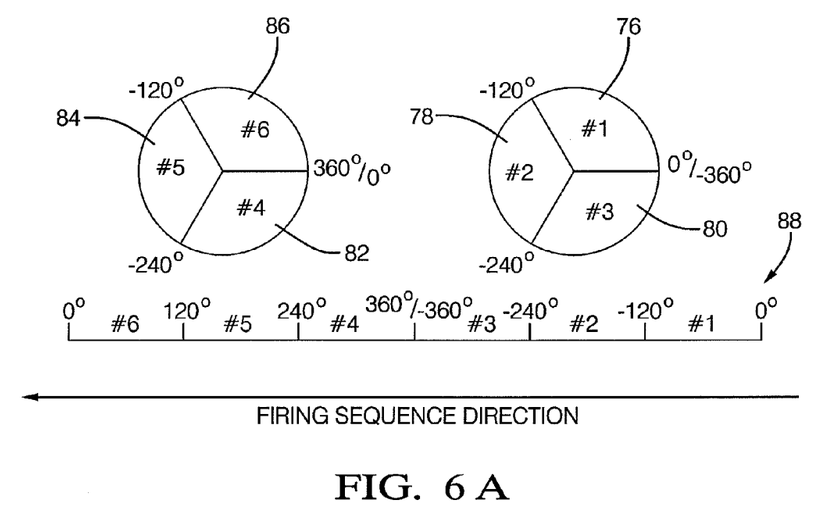
FIGS. 6A-6B are pie-chart and time-line diagrams illustrating a cylinder identification method for a continuous, single cylinder misfire.
Figure 6B:
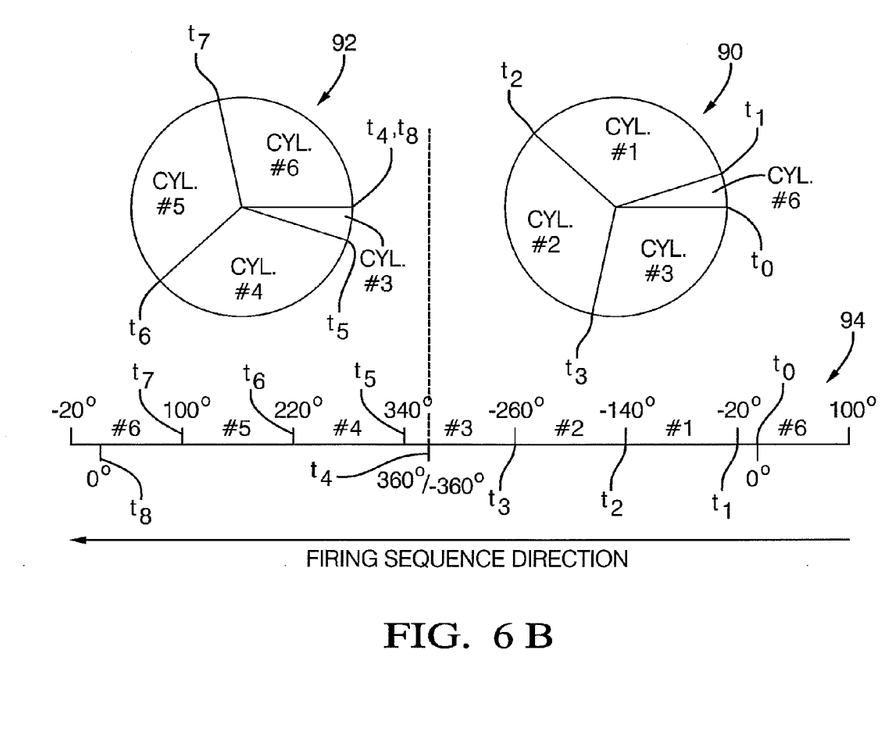

Identifying Single Cylinder. FIGS. 6A-6B depict an approach for identifying which single cylinder misfired when a continuous, single cylinder misfire condition or event has been recognized (as described above) by virtue of detecting phase-lock. A continuous misfire of a single cylinder may be detected by monitoring the relevant harmonic, which, in one embodiment, is the second harmonic of the DFT. A single-cylinder misfire represented by a pie-chart diagram spanning over a range of 720 degrees corresponds to and thus may be configured to depict combustion-event-sequence timing. The process of cylinder identification may involve evaluating equation (8), which has been adapted to calculate the phase angle of the second harmonic (i.e., $k=2$):

$$\text{Phase}N(2)=2 \cdot (360/2\pi)\arctan \{Im[XN(2)]/Re[XN(2)]\} \quad (8)$$

Note that equation (8) also includes a multiplication factor of two, which doubles the phase domain of the arctan function and leads to a workable cylinder identification logic, as shown in FIG. 6A for a six cylinder engine with a firing order of 1-2-3-4-5-6. Each cylinder is represented by a predetermined phase angle region equal to, i.e., $720°/\#Cyl.=720°/6=120°$, where (6) represents the number of cylinders for a six-cylinder engine. The identification logic thus involves defining a plurality of single-cylinder phase angle regions which are designated 76, 78, 80, 82, 84 and 86 in FIG. 6A, and which are respectively associated with and correspond to cylinder numbers 1-2-3-4-5-6. A timeline 88 illustrating the firing order or sequence is also shown in FIG. 6A. FIG. 6A thus shows, in one embodiment, the phase relations and the corresponding cylinder assignments needed for identification. In the case of a 4-cylinder engine, the individual phase angle regions will be equal to 180', and in the case of an 8-cylinder engine, the individual phase angle regions will be equal to 90'. FIG. 6A assumes that the sampling window is synchronized with the beginning of the combustion cycle for cylinder #1.

FIG. 6B shows an alternate embodiment of individual cylinder misfire identification logic, with reference to two pie-chart diagrams 90, 92 and a corresponding time-line 94. This alternate embodiment may be useful because the sampling window may be asynchronous with respect to the beginning of the combustion cycle. By way of explanation, the location of the sampling window is to a certain extent enforced by (i.e., limited by) the location of the 58× target wheel synchronization gap (described above) so that the sampling window is offset with respect to the angular position of the first firing event, which is fixed. More specifically, the location of the 58× target wheel synchronization gap is fixed with respect to the top dead center of the cylinder which starts the combustion cycle. The sampling window/combustion cycle offset avoids requiring a sample during the target wheel synchronization gap. However, this offset results in the single-cylinder phase angle regions associated with cylinder 3 and cylinder 6 being divided due to the sampling window opening asynchronously with the beginning of the combustion cycle.

With further reference to FIG. 6B, note that the firing sequence in the adopted notation starts in the negative territory and proceeds in the positive direction. Note that reference points $t_0, t_1, t_2, t_3, t_4, t_5, t_6, t_7$ and $t_8$ are shown on both the time-line 94 and the pie-charts 90, 92. As to the divided phase angle regions, the partial region representing cylinder #3 in the left pie-chart diagram 92 is the continuation of the cylinder #3 region started on the right pie-chart diagram 90, while the partial region for cylinder #6 on the left pie-chart diagram 92 is the continuation of the partial phase angle region for cylinder #6 started on the right pie-chart diagram 90.

Figure 7A:
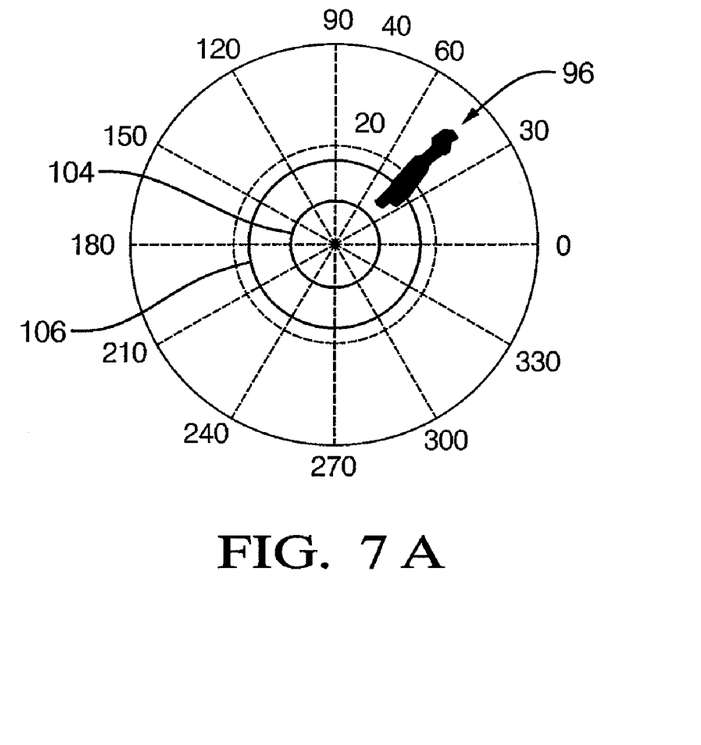
FIGS. 7A-7B are polar and pie-chart diagrams illustrating the characteristics of an opposing cylinder pair misfire and tools for identification.
Figure 7B:
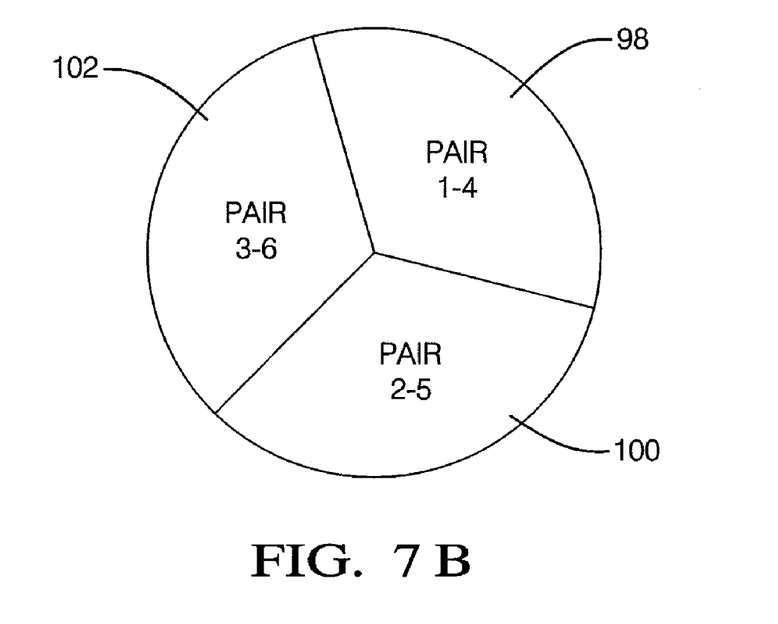

Opposing Cylinder Pair Misfire. FIG. 7A is a polar diagram and FIG. 7B is a pie-chart identification diagram, respectively. These Figures illustrate an approach for opposing cylinder pair misfire detection and identification. The DFT-derived phase angle values of the selected harmonic, which are depicted in FIG. 7A, represent misfiring of an opposing pair for a 6-cylinder engine, having a firing in the order 1-2-3-4-5-6. The data shown in FIG. 7A represent the $4^{th}$ harmonic order of the DFT, but as already described, the particular harmonic that is indicative of misfire may vary depending on the type of misfire, the sampling window and the sampling rate. The pie-chart diagram shown in FIG. 7B represents the logic for identifying misfiring opposing cylinder pairs. The positioning of the "locked" phase angle data cluster for a particular opposing cylinder pair is a function of the firing sequence and depends on the location of the first sample within the sampling window relative to the beginning of the engine cycle. That being said, note that the experimental results displayed in FIG. 7A define the center of a 120-degree-wide opposing-cylinder phase angle region (detection region). That is, the value that corresponds to the center of the array of values for the locked phase angle (see plotted data cluster 96) is located at approximately 50 degrees, which defines the center of the 120-degree-wide phase angle region 98. Thus, testing (i.e., dynamometer test) with an arbitrarily selected misfiring opposing pair (i.e., induced through the test set-up) can be used to calibrate the detection logic if the firing order is known. The same technique applied to a 4-cylinder engine would produce 180-degree phase angle regions, and applied to an 8-cylinder engine produces 90 degree phase angle regions. Further misfire testing with a different opposing cylinder pair may be conducted to determine and/or confirm which direction around the circle consecutive cylinder pairs should be represented. As shown, predetermined opposing-cylinder phase angle regions 98, 100 and 102 are associated with and respectively represent opposing cylinder pairs #1-4, #2-5 and #3-6.

For comparison purposes, FIG. 7A also shows concentric circles 104, 106, which define variation in a magnitude threshold level employed by prior magnitude-based misfire detection approaches, where the variation in the thresholds 104, 106 is defined by a range of engine speeds and loads recorded during this particular data acquisition. It should be appreciated that while the threshold in the magnitude-based approach varies with engine speed/load, the locked phase angle (plotted array of values 96) is substantially independent of engine speed and load.

Non-Opposing Cylinder Pair Misfire. Non-opposing misfiring cylinder pairs may be detected and identified using a combination of the (1) single cylinder misfire detection logic and (2) the opposing cylinder pair misfire detection logic. As described already, in one embodiment, a continuous, single cylinder misfire affects the phase angle of the second harmonic order of the DFT, while the continuous, opposing cylinder misfire affects the fourth harmonic but does not affect the second harmonic. Thus, while an opposing-pair misfire does not affect the second harmonic representing a single-cylinder misfire (i.e., the second harmonic produces phase-randomized low magnitude readings), in the case of non-opposing cylinder pair misfire, the second harmonic can provide information that would indicate (erroneously) a single-cylinder misfire. Accordingly, the detection method is configured to properly interpret this information by using simple logic which would prioritize the fourth harmonic (i.e., consider the opposing cylinder logic output in assessing the single cylinder logic). Again, mention of the second and fourth harmonic orders are exemplary only and not limiting in nature. What harmonics are relevant or are indicative of misfire (or types of misfire) will depend on all the factors described above.

Detection of Non-Opposing Cylinder Pair Misfire (Consecutive/Adjacent Cylinders). FIGS. 8A-8D depict polar diagrams and pie-chart identification diagrams used to illustrate, in a first example, detection and identification of non-opposing cylinder pair misfire (specifically consecutive cylinders) in a 6-cylinder engine having a firing order of 1-2-3-4-5-6. The FIGS. 8A-8D specifically illustrate data that would be produced when consecutive cylinder pair ##1-2 misfires.

Figure 8A:
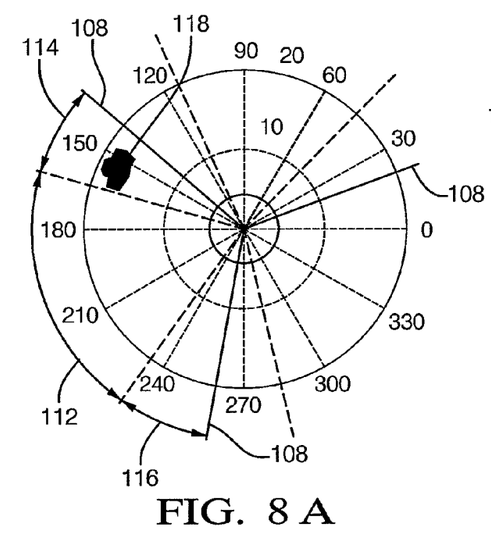
FIGS. 8A-8D are polar and pie-chart diagrams illustrating the characteristics of a first example of a non-opposing cylinder pair misfire and tools for identification.
Figure 8B:
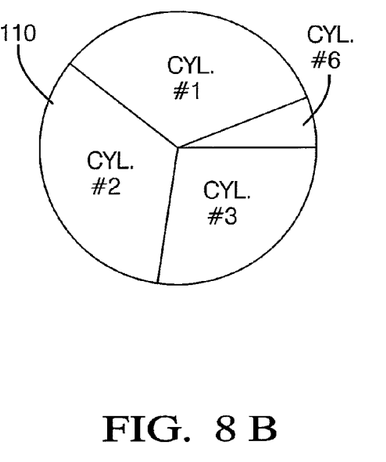

Initially, FIGS. 8A-8B illustrate the results of the continuous, single cylinder misfire detection and identification methods described herein (e.g., the results of the second harmonic of the DFT of the engine crankshaft speed signal). FIG. 8A shows dividing lines 108 that delineate the various single-cylinder phase angle regions shown in corresponding fashion in FIG. 8B. Each single-cylinder phase angle region is in turn sub-divided into a central sector and a pair of off-center sectors. For example, the single-cylinder phase angle region 110 (FIG. 8B) associated with and representing cylinder #2 is broken up into a central sector 112 and first and second off-center sectors 114 and 116. Note that the locked phase angle readings, designated 118, are located off-center in the off-center sector 114 of region 110 (FIG. 8B). Thus, the single cylinder misfire detection method points to cylinder #2 as misfiring; however, the non-opposing cylinder pair identification logic records that the single cylinder logic has output an off-center placement of the locked phase angle.

Figure 8C:
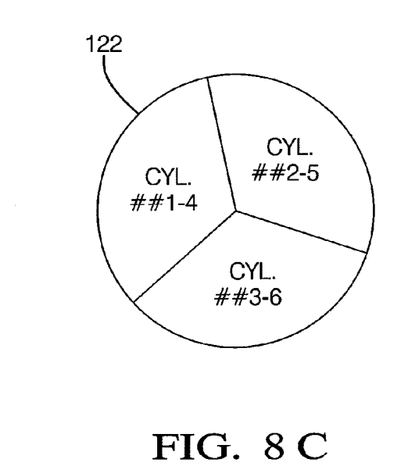
Figure 8D:
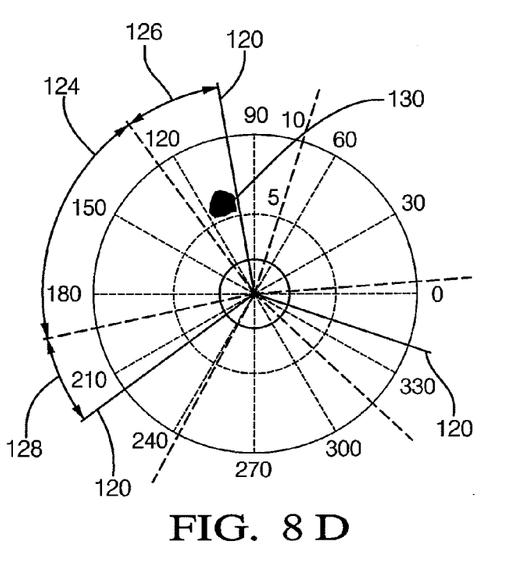

FIGS. 8C-8D illustrate the results of the continuous, opposing cylinder pair misfire detection and identification methods described herein (e.g., the results of the fourth harmonic of the DFT of the engine crankshaft speed signal). FIG. 8D shows dividing lines 120 that delineate the various opposing-cylinder phase angle regions shown in corresponding fashion in FIG. 8C. Each region is in turn sub-divided into a central sector and a pair of off-center sectors. For example, the opposing-cylinder phase angle region 122 (FIG. 8C) associated with and representing cylinder pair ##1-4 is broken up into central sector 124 and first and second off-center sectors 126 and 128. Note that the locked phase angle readings, designated 130, are located off-center in the off-center sector 126 of region 122 (FIG. 8C). Thus, the opposing cylinder pair misfire detection method points to cylinder pair ##1-4 as misfiring; however, the non-opposing cylinder pair identification logic records that the opposing cylinder logic outputs an off-center placement of the locked phase angle.

The non-opposing cylinder pair misfire identification logic is configured with a look-up table (LUT) or comparable logic (e.g., in-line logic) to decode the various combinations of (1) information from the single cylinder misfire detection logic, i.e., the identity of which single-cylinder phase angle region the locked phase angle (for the single-cylinder harmonic) falls within, and where within the identified single-cylinder phase angle region the locked phase angle is located; and (2) information from the opposing cylinder misfire detection logic, i.e., the identity of which opposing-cylinder phase angle region the locked phase angle (for the opposing-cylinder harmonic) falls within, and where within the identified opposing-cylinder phase angle region the locked phase angle is located. During run time of the system 10, the such information can be input into the LUT noted above to obtain the correct identification of the misfiring non-opposing cylinder pair. In this first example, the non-opposing cylinder pair logic indicates that the combination of outputs represents misfire from non-opposing cylinder pair ##1-2.

FIGS. 9A-9D depict polar diagrams and pie-chart identification diagrams used to illustrate, in a second example, detection and identification of non-opposing cylinder pair misfire (specifically non-consecutive non-opposing cylinder pair) in a 6-cylinder engine having a firing order of 1-2-3-4-5-6. The FIGS. 9A-9D specifically illustrate data that produced when non-consecutive non-opposing cylinder pair ##1-3 misfires.

Figure 9A:
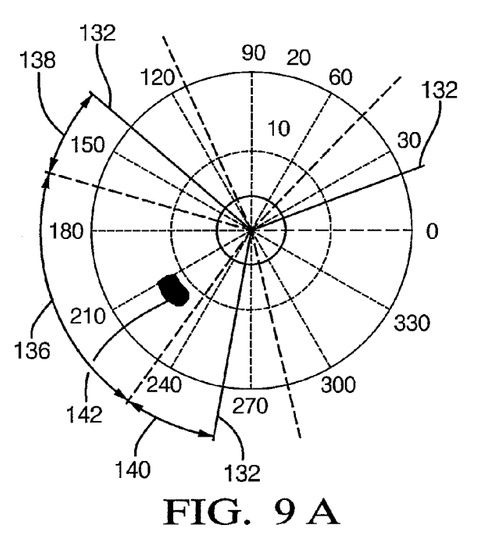
FIGS. 9A-9D are polar and pie-chart diagrams illustrating the characteristics of a second example of a non-opposing cylinder pair misfire and tools for identification.
Figure 9B:
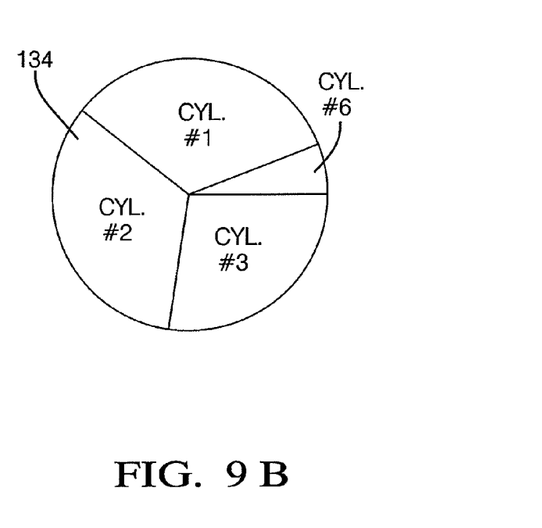

Initially, FIGS. 9A-9B illustrate the results of the continuous, single cylinder misfire detection and identification methods described herein (e.g., the results of the second harmonic of the DFT of the engine crankshaft speed signal). FIG. 9A shows dividing lines 132 that delineate the various single-cylinder phase angle regions shown in corresponding fashion in FIG. 9B. Each single-cylinder phase angle region is in turn sub-divided into a central sector and a pair of off-center sectors. For example, the single-cylinder phase angle region 134 (FIG. 9B) associated with and representing cylinder #2 is thus broken up into central sector 136 and first and second off-center sectors 138 and 140. Note that the locked phase angle readings, designated 142, are located in the central sector 136 of region 134 (FIG. 9B). Thus, the single cylinder misfire detection method points to cylinder #2 as misfiring; however, the non-opposing cylinder pair identification logic records that the single cylinder misfire logic outputs an on-center placement of the locked phase angle.

Figure 9C:
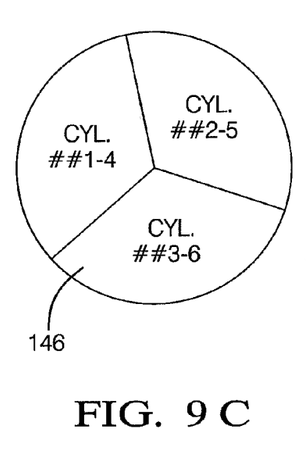
Figure 9D:
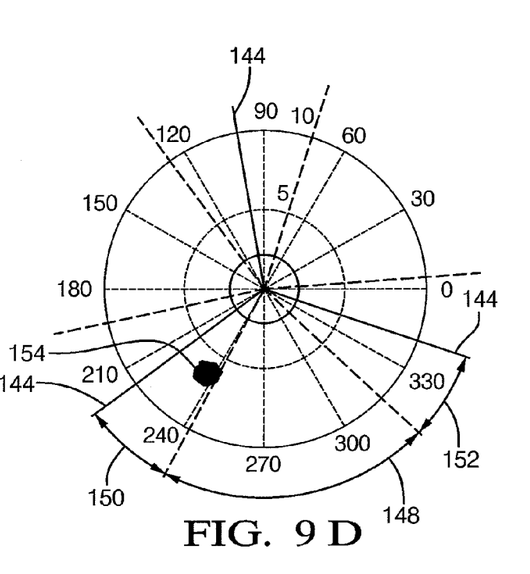

FIGS. 9C-9D illustrate the results of the continuous, opposing cylinder pair misfire detection and identification methods described herein (e.g., the results of the fourth harmonic of the DFT of the engine crankshaft speed signal). FIG. 9D shows dividing lines 144 that delineate the various opposing-cylinder phase angle regions shown in corresponding fashion in FIG. 9C. Each region is in turn sub-divided into a central sector and a pair of off-center sectors. For example, the opposing-cylinder region 146 (FIG. 9C) associated with and representing cylinder pair ##3-6 is broken up into central sector 148 and first and second off-center sectors 150 and 152. Note that the locked phase angle readings, designated 154, are located off-center in the off-center sector 150 of region 146 (FIG. 9C). Thus, the opposing cylinder pair misfire detection method points to cylinder pair ##3-6 as misfiring; however, the non-opposing cylinder pair identification logic records that the opposing cylinder logic outputs an off-center placement of the locked phase angle.

In this second example, the non-opposing cylinder pair logic indicates that the combination of outputs represents misfire from non-opposing, non-consecutive cylinder pair ##1-3.

Figure 10:
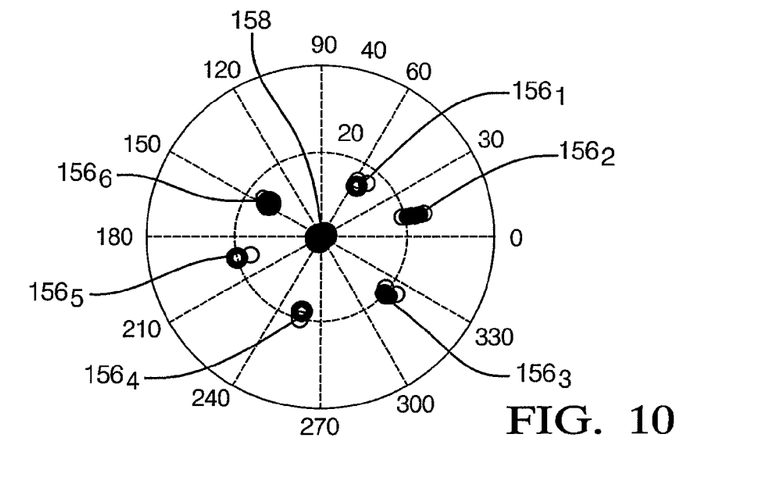
FIG. 10 is a phase diagram of DFT-derived harmonics representing intermittent, misfire of all cylinders of a 6-cyl. engine.

FIG. 10 is a phase diagram of DFT-derived harmonics representing single-cylinder sporadic misfire. A misfire event is not necessarily associated with a continuous combustion failure of an individual cylinder. It may occur sporadically and may or may not be associated with a particular, single cylinder. An example of random misfire affecting all engine cylinders is depicted in FIG. 10. The data shown in FIG. 10 was acquired from a 6-cylinder engine. The data was acquired with artificially induced conditions which generated random misfires of all six cylinders. First, the pattern of the phase-locked readings clearly indicates that the same method as described above for identifying a single cylinder misfire may be used for identification of sporadically misfiring cylinders. In this regard, FIG. 10 shows six locked phase angle data clusters $156_1$, $156_2$, $156_3$, $156_4$, $156_5$ and $156_6$, each one associated with a respective single cylinder. Second, at the same time, the results shown in FIG. 10 demonstrate the randomness of the phase readings (at minute amplitudes) for firing events delivering proper combustion. In this regards, the data points located at the center of the diagram, designated 158, represent firing events (i.e., not misfire). Phase alone can be used for detecting a misfire, only if a misfire count assessment is performed periodically. If instant detection of a misfire is requested, then monitoring the amplitude is necessary.

Windowing leading to the detection of sporadic misfires is different from that of a continuous misfire. Therefore, identification of individual misfiring cylinders is represented by a different, position-based look-up table (represented herein by pie-chart diagrams). When a sporadic misfire of an individual cylinder becomes more frequent, the limit becomes continuous misfire. Therefore, the single-cylinder continuous misfire detection method is in some sense redundant. Its counterpart, operating within a different sampling window but serving sporadic misfires, will also deliver misfiring flags if a single cylinder misfires continuously. Such redundancy is, however, harmless, and if nothing else, increases the confidence level in misfire detection. On the other hand, opposing pairs are not detectable by the single-cylinder misfire detection method. As was mentioned earlier, detection of misfiring opposing pairs presents the biggest challenge because the engine torque at every engine rotation is affected at the same moment.

Figure 11:
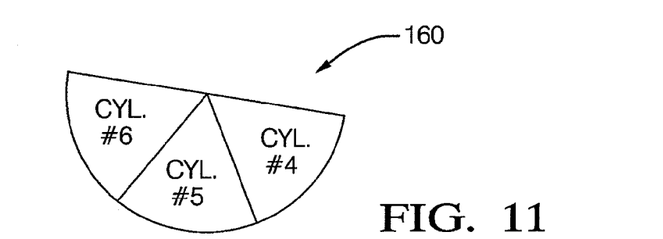
FIGS. 11-12 are pie-chart diagrams illustrating an alternate, two sampling window method for misfire identification.
Figure 12:
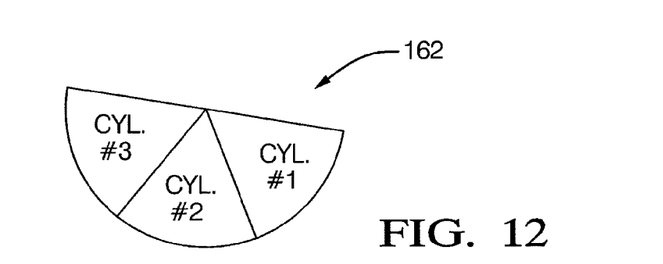
Figure 13:
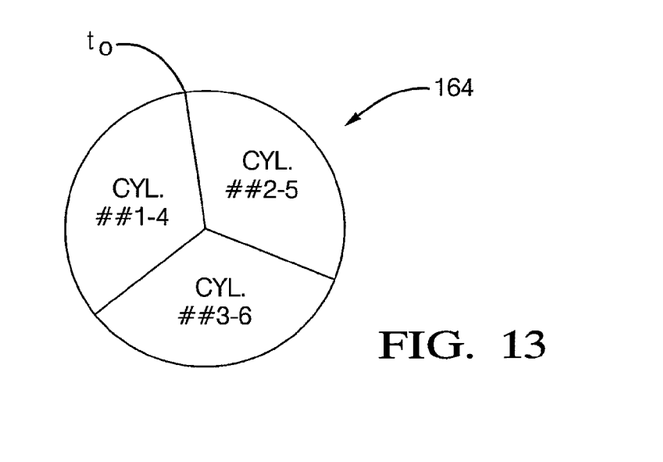
FIG. 13 is a pie-chart diagram illustrating a still further sampling window for misfire identification.

FIGS. 11-13 are pie-chart diagrams illustrating variations. A different DFT representation, i.e., a different sampling method and/or a different selection of a specific harmonic may lead to a DFT calculated phase range equal to 360° which might be used either for the individual cylinder misfire identification, or opposing-pair misfire identification. FIGS. 11-13 should be taken with respect to an exemplary 6-cylinder engine with a 1-2-3-4-5-6 firing order.

FIGS. 11 and 12 are pie-chart diagram views reflecting two sampling windows that open at respective, different times. Each pie-chart 160, 162 is configured to monitor the performance of individual cylinders. The pie-chart diagrams 160, 162 marking individual cylinders domain are tilted to indicate that the starting angle of the pie-chart depends where the crankshaft (engine speed) signal sampling starts in reference to the angular position of the beginning of the combustion cycle.

FIG. 13 is a pie-chart diagram view reflecting yet another sampling approach. The pie-chart diagram 164 illustrates yet another sampling window which as indicated may represent and thus be used in a method for detecting opposing cylinder pair misfire. Since the 6-cylinder engine has three opposing cylinder pairs, each individual pair domain is 360°/3=120° wide. As already described, correspondingly, a 4-cylinder engine will have 180° phase angle region and an 8-cylinder engine will have a 90° wide phase angle region. As shown, the positioning of the predetermined phase angle regions from the 0° through 360° depends, like in other examples, on the location of the first sample (see point $t_0$) for example).

Figure 14A:
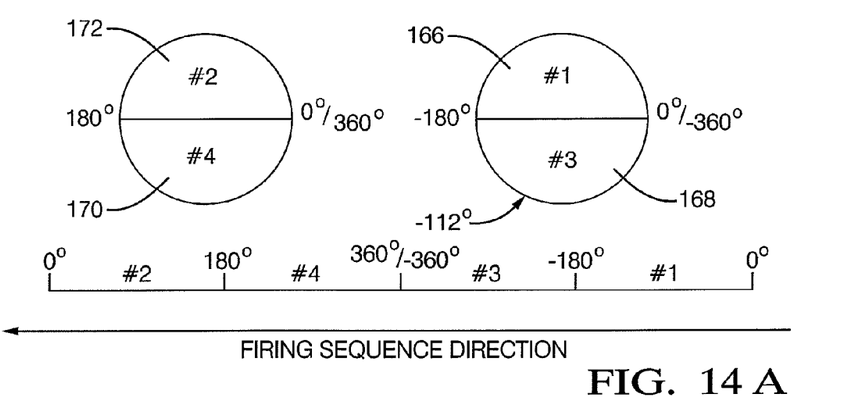
FIGS. 14A-14C are timeline and phase diagrams illustrating a method for repositioning a phase angle detection region.
Figure 14B:
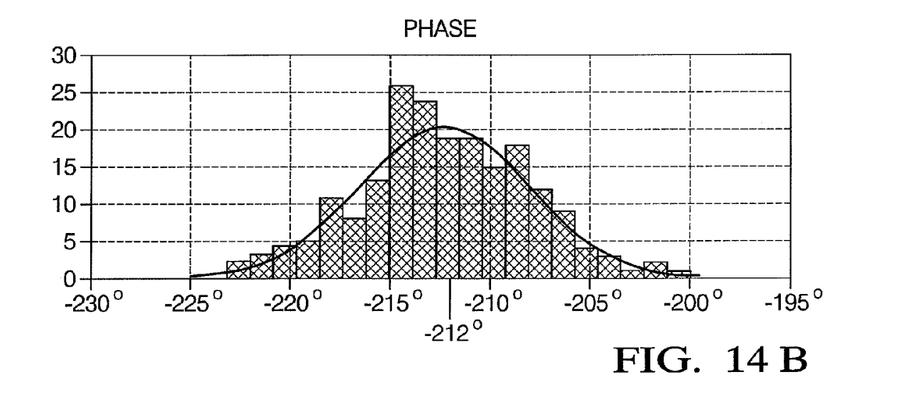
Figure 14C:
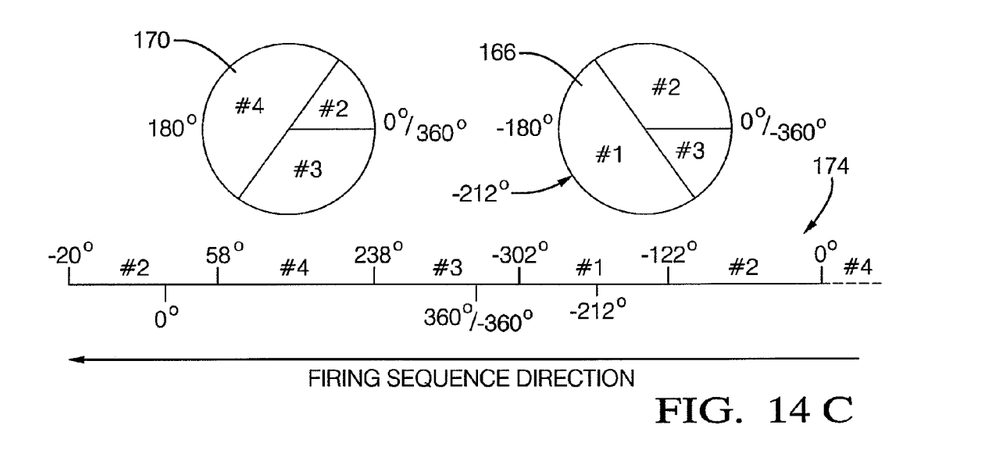

FIGS. 14A-14C illustrate a method for setting (and re-setting or repositioning) the polar graph based on a test results (e.g., a single misfire experiment). FIGS. 14A-14C illustrate this method for an exemplary phase range of [−360° to 360°] for a 4 cylinder engine, having an engine firing order as follows: 1-3-4-2.

FIG. 14A shows the initial positioning and allocation of phase angle regions 166, 168, 170 and 172 associated with and corresponding to cylinders 1-3-4-2 based on a 180 degree phase angle region width.

FIG. 14B shows, however, that for a selected positioning of the first engine speed sample taken in the sampling window, the measured phase angle (i.e., actually, the resulting array of phase angle values) yields a unique, locked position when cylinder #1 is misfiring. It should be appreciated that the data should be acquired sweeping a full range of engine speed and loads. Based on the distribution of the phase angle readings, the most probable phase angle location for misfiring cylinder #1 is equal to about −212° in this example (see the phase distribution in FIG. 14B).

FIG. 14C shows the adjustments made to the cylinder identification pie-chart diagrams. In view of the results from the initial empirical test (i.e., FIG. 14B), the phase angle regions 166, 168, 170 and 172 need to be adjusted to reflect the now most probable locked phase angle location, preferably centered about the most likely phase angle "lock" location. In this regard, FIG. 14C also shows a corresponding, revised time-line 174 of the cylinder firing order vis-à-vis the sampling window. As shown, the phase angle region 166 associated with cylinder #1 has been repositioned so that a −212° location is centered in the middle of the phase angle region 166. The final "start" and/or "end" locations (i.e., in degrees) is determined, and can be used to define the predetermined phase angle region used in the misfire detection methods described herein. The other phase angle regions 168, 170 and 172 are likewise repositioned, and their extents are now also defined predetermined phase angle regions.

From the foregoing, it should be appreciated that predetermined phase angle region data 42 (best shown in block form in FIG. 1) may include different data depending on the misfire condition being identified. For example, for single cylinder misfire, the data 42 may comprise a plurality of single-cylinder phase angle regions each associated and intended to identify a single cylinder, whose respective width may further depend on the number of cylinder in the engine being monitored (e.g., 120 degrees for a 6-cylinder engine), whose respective "start" and/or "end" location may be specified, as well as further data to specify the width, starting and ending locations of the central sector and off-center sectors, all as described herein above. Additionally, it should be understood that the cylinder identification logic 44 may include any one or more of the various identification methods described herein, including continuous, single cylinder identification logic, continuous, opposing cylinder pair identification logic, continuous non-opposing cylinder pair identification logic, and random or sporadic misfire detection logic.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method for misfire detection in an internal combustion engine system, comprising the steps of:
    producing a first signal corresponding to rotational characteristics of an engine crankshaft taken at selected times;
    converting the first signal into frequency-domain real and imaginary components at one or more selected harmonic orders thereof;
    normalizing the real and imaginary components using predetermined non-misfire data indicative of corresponding real and imaginary components for non-misfire operation of the engine system;
    determining, for each selected harmonic order, a respective phase angle using the normalized real and imaginary components; and
    detecting a misfire condition when the determined phase angle is maintained within a predetermined range thereby defining a locked phase angle.

2. The method of claim 1 wherein said detecting step includes the substep of confirming that the determined phase angle is maintained within the predetermined range for a minimum number of combustion cycles.

3. The method of claim 1 further including the steps of:
    defining, for each selected harmonic order, a respective plurality of predetermined phase angle regions; and
    identifying one or more misfiring cylinders based on at least which region the locked phase angle falls within.

4. The method of claim 3 wherein one of the selected harmonic orders is associated with a single cylinder misfire condition, said step of identifying misfiring cylinders includes the sub-steps of:
    identifying which one of the plurality of regions the locked phase angle falls within;
    identifying the single cylinder that misfired based on the identified region.

5. The method of claim 3 wherein one of the selected harmonic orders is associated with an opposing cylinder pair misfire condition, said step of identifying misfiring cylinders includes the sub-steps of:
    associating with each phase angle region a respective one of the opposing cylinder pairs;
    locating the locked phase angle within one of the phase angle regions; and
    determining the opposing cylinder pair that misfired based on what the cylinder pair associated with the region in which the locked phase angle is located.

6. The method of claim 3 wherein a first one of the selected harmonic orders is associated with a single cylinder misfire condition, a second one of the selected harmonic orders is associated with an opposing cylinder misfire condition, each of the first and second harmonic orders has a respective first and a second locked phase angle associated therewith, said misfire condition is a non-opposing cylinder pair misfire condition, said step of identifying misfiring cylinders includes the sub-steps of:
    identifying a single cylinder using the first locked phase angle resulting from the misfire condition;
    identifying an opposing cylinder pair using the second locked phase angle resulting from the misfire condition; and
    identifying a non-opposing cylinder pair based at least on the identification of the single cylinder and opposing cylinder pair.

7. The method of claim 6 said step of identifying a non-opposing cylinder pair includes the further sub-steps of:
    associating, for the first one of the harmonic orders, a respective single-cylinder phase angle region with each single cylinder;
    determining the identity of the single-cylinder phase angle region that the first locked phase angle falls within;
    associating, for the second one of the harmonic orders, a respective opposing-cylinder phase angle region with each opposing cylinder pair;
    determining the identity of the opposing-cylinder phase angle region that the second locked phase angle falls within; and
    identifying the non-opposing cylinder pair that misfired based on at least the identified single-cylinder phase angle region and the identified opposing-cylinder phase angle region.

8. The method of claim 7 further including:
    determining a first location of the first locked phase angle within the identified single-cylinder phase angle region;
    determining a second location of the second locked phase angle within the identified opposing-cylinder phase angle region; and
    identifying the non-opposing cylinder pair further as a function of the first and second locations.

9. The method of claim 8 wherein said first location is one of a central sector location and an off-center sector location, said second location is one of a central sector location and an off-center location.

10. The method of claim 3 further including the step of:
    positioning the phase angle regions so that an expected position of the locked phase angle falls substantially at the center of the phase angle region.

11. The method of claim 1 wherein the first signal comprises an engine crankshaft speed signal.

12. The method of claim 1 wherein said converting step includes the sub-steps of:
    defining a sampling interval during which said first signal is defined in N samples;
    selecting at least one harmonic order;
    applying a Discrete Fourier Transform (DFT) to the first signal comprising N samples to obtain the real and imaginary components for the selected harmonic order.

13. The method of claim 12 wherein said step of selecting a harmonic order includes selecting a plurality of harmonic orders.

14. The method of claim 12 wherein said internal combustion engine system includes a target wheel configured for rotation with said crankshaft, said target wheel being configured for use with a crankshaft sensor for sensing an angular position of said crankshaft, said target wheel including a plurality of radially-outwardly projecting teeth separated by intervening slots, said target wheel having a synchronization gap, said step of defining a sampling interval includes the sub-step of:
    orienting the sampling interval relative to said target wheel so that said N samples fall outside of said synchronization gap.

* * * * *